United States Patent
De'Longhi et al.

(10) Patent No.: US 10,758,076 B2
(45) Date of Patent: Sep. 1, 2020

(54) COFFEE MACHINE AND RELATIVE CONTROL METHOD

(71) Applicant: De'Longhi Appliances S.R.L., Treviso (IT)

(72) Inventors: Giuseppe De'Longhi, Treviso (IT); Paolo Evangelisti, Bologna (IT); Davide Bonotto, Vazzola (IT)

(73) Assignee: De'Longhi Appliances S.R.L., Treviso (IT)

( * ) Notice: Subject to any disclaimer, the term of this patent is extended or adjusted under 35 U.S.C. 154(b) by 514 days.

(21) Appl. No.: 15/547,831

(22) PCT Filed: Feb. 2, 2016

(86) PCT No.: PCT/EP2016/052147
§ 371 (c)(1),
(2) Date: Aug. 1, 2017

(87) PCT Pub. No.: WO2016/124573
PCT Pub. Date: Aug. 11, 2016

(65) Prior Publication Data
US 2018/0014685 A1  Jan. 18, 2018

(30) Foreign Application Priority Data
Feb. 5, 2015 (IT) .............................. MI2015A0153

(51) Int. Cl.
*A47J 31/057* (2006.01)
*A47J 31/06* (2006.01)
(Continued)

(52) U.S. Cl.
CPC ......... *A47J 31/0647* (2013.01); *A47J 31/057* (2013.01); *A47J 31/3619* (2013.01); *A47J 31/42* (2013.01)

(58) Field of Classification Search
CPC .. A47J 31/0647; A47J 31/3619; A47J 31/057; A47J 31/42
(Continued)

(56) References Cited

U.S. PATENT DOCUMENTS 3,505,947 A   4/1970 Bresaola
4,659,023 A * 4/1987 Frei .......................... A47J 42/40
                                                                241/30
(Continued)

OTHER PUBLICATIONS

International Search Report dated Jul. 6, 2016; International Application No. PCT/EP2016/052147; International Filing Date: Feb. 2, 2016; 4 pages.
(Continued)

*Primary Examiner* — Dana Ross
*Assistant Examiner* — Kuangyue Chen
(74) *Attorney, Agent, or Firm* — Blank Rome LLP

(57) ABSTRACT

A coffee machine including a controller, an infusion cylinder that can be loaded with a ground coffee dose, an ejection piston slidably supported inside the infusion cylinder, a closing piston engageable in the infusion cylinder to create a closed infusion chamber for the ground coffee dose, delimited between a lateral wall of the infusion cylinder, the ejection piston and the closing piston. Electrical actuation moves the infusion cylinder between a lower travel limit stop, where the ground coffee dose is loaded, and an upper travel limit stop where the infusion process occurs, an adjuster for positioning the upper travel limit stop based on the size of the loaded ground coffee dose, so that in the position of the upper travel limit stop, the infusion chamber has a volume sufficient to contain the ground coffee dose without compressing it.

7 Claims, 6 Drawing Sheets

(51) Int. Cl.
*A47J 31/36* (2006.01)
*A47J 31/42* (2006.01)

(58) Field of Classification Search
USPC .......................................................... 99/280
See application file for complete search history.

(56) References Cited

U.S. PATENT DOCUMENTS

| | | | | |
|---|---|---|---|---|
| 5,007,333 | A * | 4/1991 | Sager | A47J 31/3619 |
| | | | | 99/286 |
| 5,153,016 | A | 10/1992 | Goeckelmann | |
| 5,463,934 | A | 11/1995 | Locati | |
| 5,492,054 | A * | 2/1996 | Schneeberger | A47J 31/3609 |
| | | | | 99/287 |
| 10,085,588 | B2 * | 10/2018 | Remo | A47J 31/42 |
| 2009/0159612 | A1 * | 6/2009 | Beavis | A47J 31/42 |
| | | | | 222/52 |
| 2009/0293733 | A1 * | 12/2009 | Martin | A47J 31/60 |
| | | | | 99/280 |
| 2015/0351580 | A1 * | 12/2015 | Ferraro | A47J 31/3671 |
| | | | | 426/431 |
| 2016/0242590 | A1 * | 8/2016 | Grassia | A47J 31/0663 |

OTHER PUBLICATIONS

Written Opinion dated Jul. 6, 2016; International Application No. PCT/EP2016/052147; International Filing Date: Feb. 2, 2016; 6 pages.

* cited by examiner

US 10,758,076 B2

COFFEE MACHINE AND RELATIVE CONTROL METHOD

RELATED APPLICATIONS

This application is a U.S. national phase application of International Application No. PCT/EP2016/052147, filed Feb. 2, 2016; which application claims priority to Italy Application No. MI2015A 000153, filed Feb. 5, 2015. Each of the above-identified related applications are incorporated by reference.

FIELD OF USE

The present invention relates to a coffee machine and to a relative control method.

BACKGROUND OF THE INVENTION

Many machines for making drip coffee or American coffee currently available on the market essentially comprise a water boiler, a percolating chamber, where a paper filter can be positioned and the load of loose coffee grounds being placed on the filter, and a carafe for collecting the percolated coffee, the carafe being positioned below the filter.

The boiler supplies water to the percolating chamber, where by the effect of its own weight the water percolates through the load of loose coffee grounds and the resulting percolated coffee is collected in the carafe.

These drip coffee machines offer the undeniable advantage of being simple in construction with extremely limited production costs.

However, one of the factors that can hinder an even more widespread commercial distribution of such machines lies in the fact that as they have a strong tendency to get dirty with residue retaining liquid from load of spent coffee grounds, they require frequent and meticulous manual cleaning to keep them operating correctly.

The need to replace and dispose of the paper filter after each use also involves negative environmental impacts.

SUMMARY OF THE INVENTION

The technical task of the present invention is therefore to realize a coffee machine and a method for preparing a cup of coffee that make it possible to eliminate the cited technical drawbacks of the prior art.

Within the scope of this technical task, an aim of the invention is to realize a coffee machine that offers the user extremely easy, clean and reliable operation.

Another aim of the invention is to offer a machine that can produce a cup of an American type of coffee.

The technical task, as well as the latter and other aims, according to the present invention, are achieved by realizing a coffee machine according to claim 1.

In a preferred embodiment of the invention, the coffee machine comprises a dosing means for dosing ground coffee, the dosing means being configured to load doses of a known size in the infusion cylinder.

In a preferred embodiment of the invention, the dosing means comprises a grinder.

In a preferred embodiment of the invention, the closing piston is translatable in contrast to and by action of at least one spring.

In a preferred embodiment of the invention, the adjustment means comprises a microswitch that can be activated by a movement of said closing piston or by the infusion cylinder.

In a preferred embodiment of the invention, the adjustment means comprises a detector for detection of the absorption of said electrical actuation.

The present invention also discloses a control method for a coffee machine comprising a controller, an infusion cylinder that can be loaded with a dose of ground coffee, an ejection piston slidably supported inside the infusion cylinder, a closing piston that is engageable in the infusion cylinder so as to create a closed infusion chamber for the dose of ground coffee delimited between the lateral wall of the infusion cylinder, the ejection piston and the closing piston, and electrical actuation suitable for moving said infusion cylinder between a lower travel limit stop where the dose of ground coffee is loaded, and an upper travel limit stop where the infusion process is carried out, the control method being characterized in that it adjusts the position of said upper travel limit stop based on the size of the dose of ground coffee loaded, so that in the position of said upper travel limit stop, said infusion chamber is of a volume sufficient to contain the dose of ground coffee without compressing it.

In a preferred embodiment of the invention, in which said coffee machine comprises a grinder, it is envisaged selecting, by means of a user interface, a known size of a dose of ground coffee to be loaded, from amongst a plurality of known sizes of predefined doses, and the controller acquires this selection, automatically associates a grinding time with the selected size of the dose of ground coffee and acquires from a database a position of said upper travel limit stop corresponding to the grinding time, and commands the movement of the infusion cylinder towards said acquired position of said upper travel limit stop.

In a preferred embodiment of the invention, the controller commands the execution of a first course of travel of the infusion cylinder to a temporary position beyond the position of the upper travel limit stop, and a second course of travel in the opposite direction from the temporary position to the position of the upper travel limit stop of the infusion cylinder; in the temporary position of the infusion cylinder, the closing piston exerts a predefined level of compression on the dose of ground coffee and the compression is released when the position of the upper travel limit stop has been reached.

In a preferred embodiment of the invention, said predefined compression level is signalled to the controller by a microswitch that can be activated by a movement of the closing piston.

In a preferred embodiment of the invention, said predefined compression level is signalled to the controller by a detector for detecting absorption of the actuation.

BRIEF DESCRIPTION OF THE DRAWINGS

Further characteristics and advantages of the invention will become more apparent from the description of a preferred, but not exclusive, embodiment of the coffee machine according to the invention, which is illustrated by way of approximate and non-limiting example in the attached drawings, of which.

DETAILED DESCRIPTION OF THE ILLUSTRATED EMBODIMENTS

Figure 1:
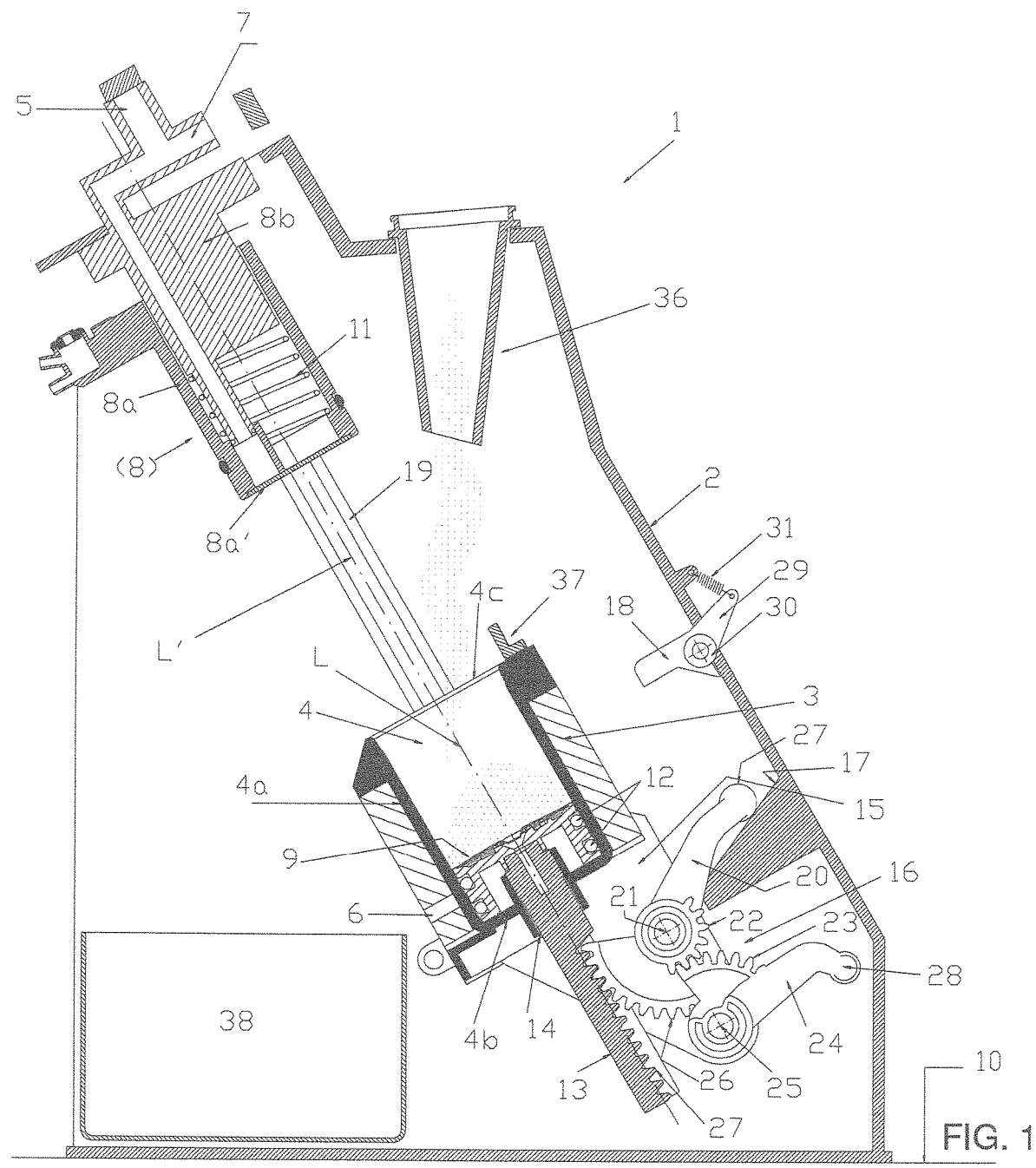
FIG. 1 is a schematic sectional view of the machine with the infusion unit in the position for loading the dose of coffee grounds.
Figure 2:
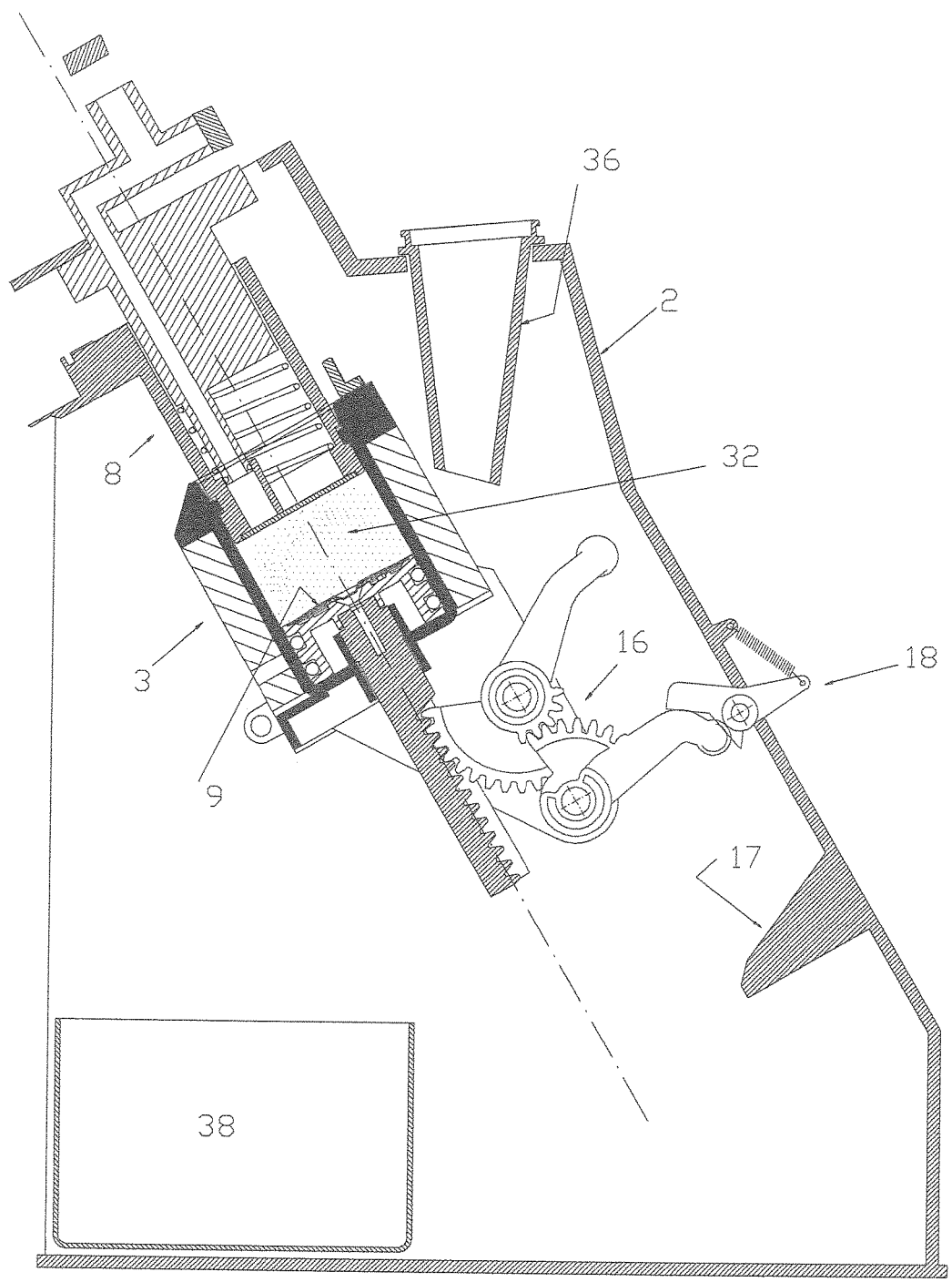
FIG. 2 is a view of the machine appearing in FIG. 1 with the infusion unit in the infusion position.
Figure 3:
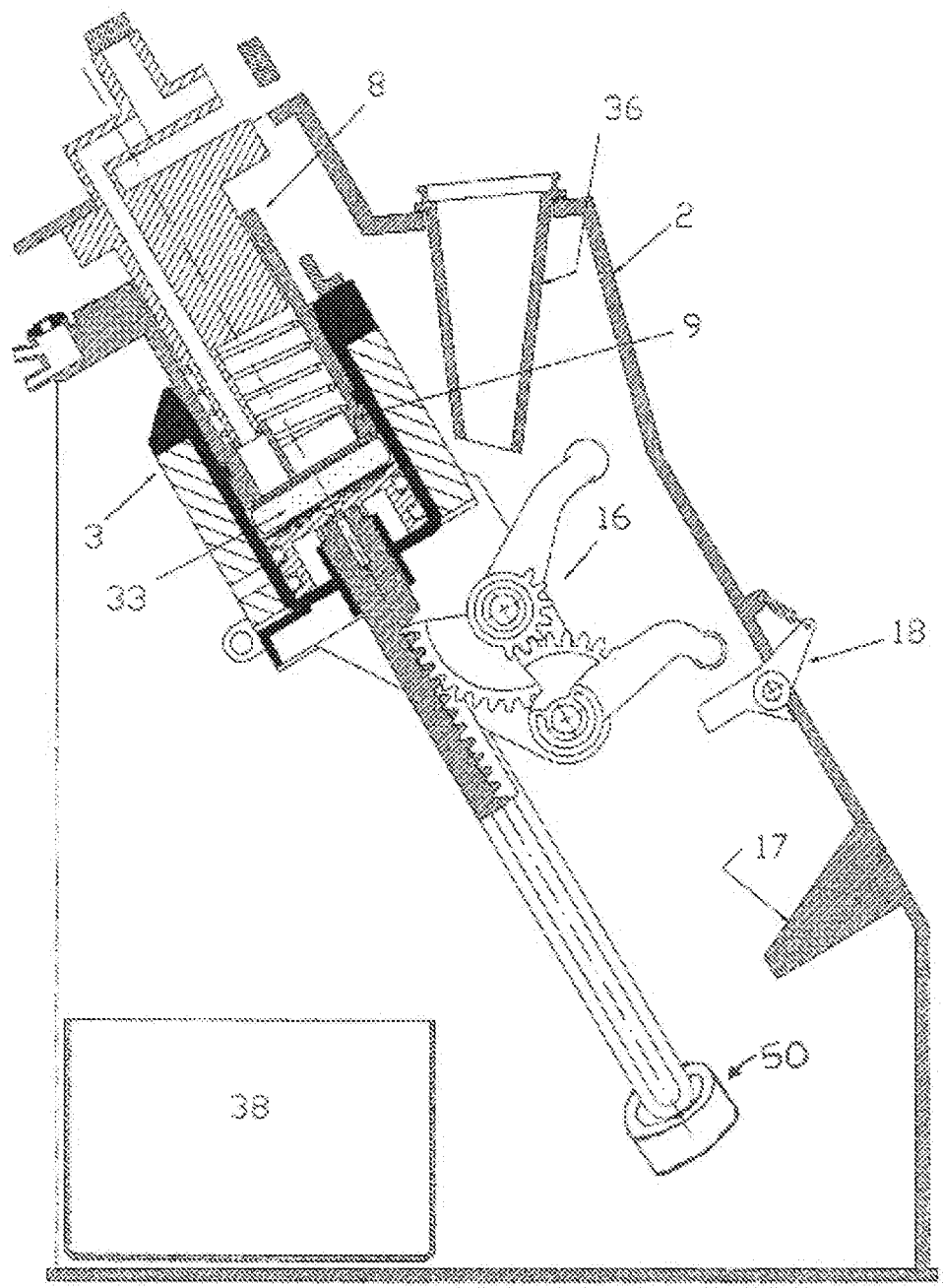
FIG. 3 is a view of the machine appearing in FIG. 1 with the infusion unit in the position for drying the dose of spent coffee grounds.
Figure 4:
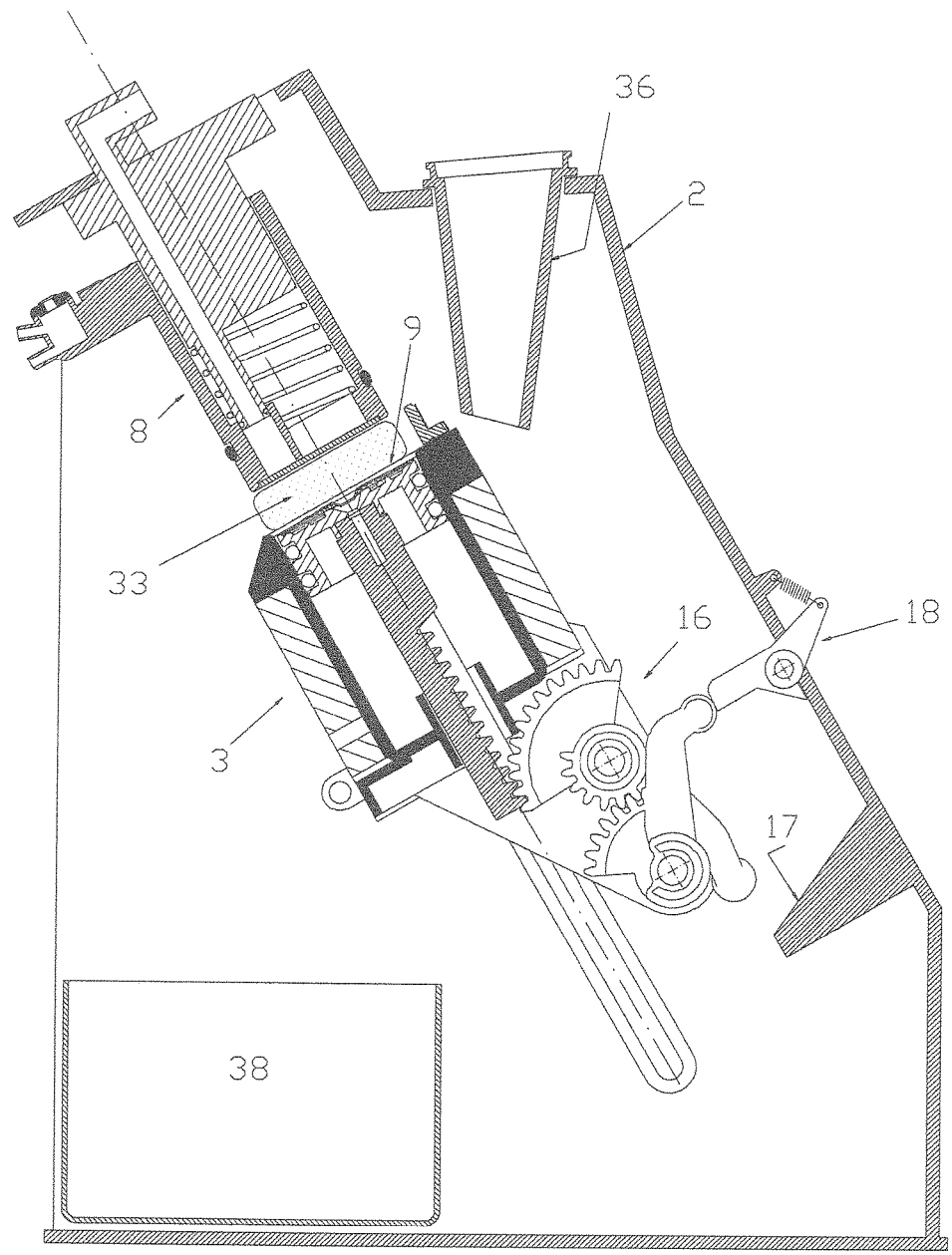
FIG. 4 is a view of the machine appearing in FIG. 1 with the infusion unit in the position for extraction of the dose of spent coffee grounds from the infusion chamber.
Figure 5:
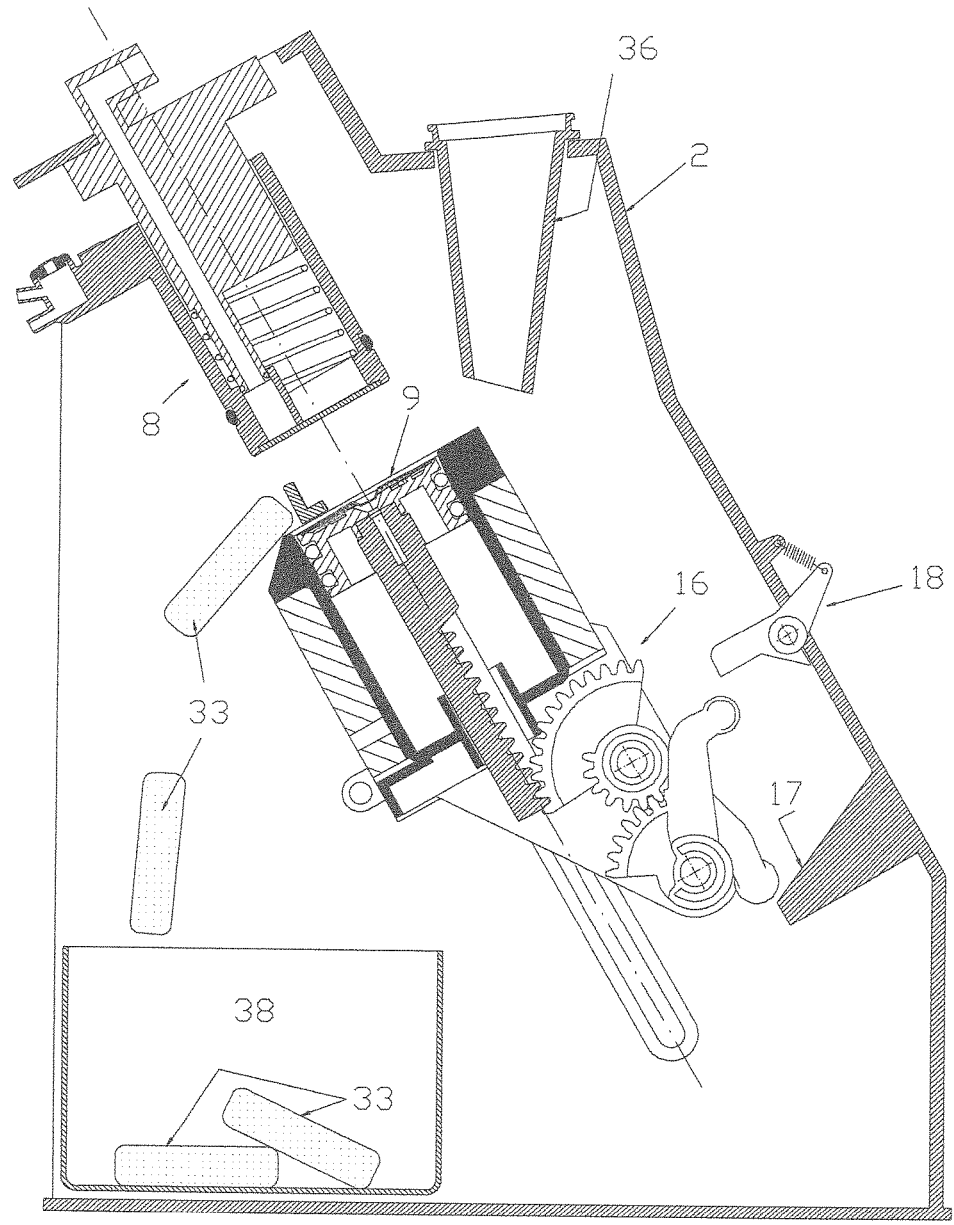
FIG. 5 is a view of the machine appearing in FIG. 1 with the infusion unit in the position for ejection of the dose of spent coffee grounds from the infusion chamber.

With reference to the figures cited, a coffee machine is shown and indicated in its entirety by reference number 1.

The coffee machine 1 comprises a frame that delimits a containment body 2 for a movable infusion unit 3.

The infusion unit comprises an infusion cylinder 100 that can be loaded with a dose of ground coffee 32, an ejection piston 9 slidably supported inside the infusion cylinder 100, a closing piston 8 that is engageable in the infusion cylinder 100 so as to create a closed infusion chamber 4 for the dose of ground coffee 32 delimited between the lateral wall of the infusion cylinder, the ejection piston 9 and the closing piston 8.

Specific electrical actuation is suitable for moving the infusion cylinder 100 between a lower travel limit stop where the dose of ground coffee 32 is loaded, and an upper travel limit stop where the infusion process is carried out.

The infusion cylinder 100 has a cylindrical lateral wall 4a, a lower base 4b and an upper, open access mouth 4c.

The frame supports a pump (unillustrated) for supplying a flow of infusion water to the infusion unit 3, and a boiler (unillustrated) for heating the flow of infusion water.

The coffee machine 1 further exhibits a controller (unillustrated) that is in communication with the boiler, with the pump and with specific movement means for moving the infusion unit 3.

The hydraulic circuit of the coffee machine 1 further comprises a supply line 5 for supplying the flow of infusion water to the infusion unit 3, a dispensing line 6 for dispensing the coffee infusion, and a drain line 7.

The infusion cylinder 100 has its upper, open access mouth 4c facing the closing piston 8 above it that is supported by the frame.

The supply line 5 and the drain line 7 extend within the closing piston 8.

The ejection piston 9 is translatable coaxially with the axis L of the infusion cylinder 100.

The ejection piston 9 has perimeter gaskets 12 for radial sealing with the lateral wall 4a of the infusion cylinder 100.

The ejection piston 9 also has a rod 13 that is slidably guided in a through hole 14 in the lower base 4b of the infusion cylinder 100.

The rod 13 of the ejection piston 9 extends from the external side of the base 4b of the infusion cylinder 100.

The infusion unit 3 is supported in a releasable manner by a carriage 15.

The containment body 2 has a window (unillustrated) for extraction of the infusion unit 3.

Therefore, the infusion unit 3 can be easily inspected outside of the coffee machine 1 when it is released from the carriage 15.

The carriage 15 supports a linkage 16 for activating the ejection piston 9 interacting with a cam control means 17, 18 that is supported by the containment body 2 of the infusion unit 3.

The linkage 16 comprises a first lever 20 having its fulcrum in 21 pivoted to the carriage 15 and having a toothed arc 22 meshing with a toothed arc 23 of a second lever 24 having its fulcrum in 25 pivoted to the carriage 15.

The first lever 20 has an additional toothed arc 26 meshing with a rack 27 afforded on the rod 13 of the ejection piston 9.

In conclusion, the first lever 20 has an arm 27 for taking movement from the cam means 17, which is, in turn, made up of a cam surface afforded by the containment body 2.

The second lever 24, in turn, has an arm 28 for taking movement from the cam means 18, which is, in turn, made up of a cam surface afforded on an element 29 having its fulcrum in 30 pivoted to the containment body 2 and oscillating in contrast to and by action of a spring 31.

The infusion cylinder 100 is movable in translational motion along a rectilinear trajectory L' that is inclined with respect to the rest plane 10 of the coffee machine 1.

The actuation of the infusion cylinder 100 comprises a motorized endless screw 19 oriented parallel to the rectilinear trajectory and engaged in a female thread (unillustrated) integral with the carriage 15.

Depending on the direction of rotation, the rotation of the endless screw 19 on itself results in the ascent or descent of the infusion cylinder 100.

The infusion cylinder 100 is oriented coaxially with respect to the rectilinear trajectory L' of the infusion cylinder 100.

The orientation of the infusion cylinder 100 can be fixed, as shown, or the possibility of rotation of the infusion chamber 4 can be comprised at the lower travel limit stop, for example so as to be arranged with the axis orthogonal to the rest plane 10 so as to facilitate the procedure for loading the dose of ground coffee.

The orientation of the closing piston 8 is fixed coaxially with respect to the rectilinear trajectory L' of the infusion cylinder 100.

The closing piston 8 comprises an internal fixed part 8b for supporting and guiding an external part 8a that is movable in contrast to and by action of a spring 11 in the direction of the rectilinear trajectory L' of the infusion cylinder 100.

The supply line 5 and the drain line 7 are connected with through holes 8a' present at the lower end of the external part 8a of the closing piston 8.

According to a salient aspect of the invention, the coffee machine has adjustment means for adjusting the position of the upper travel limit stop of the infusion cylinder 100 to the size of the dose of ground coffee loaded, so that the infusion chamber 4 defined at the position of the upper travel limit stop of the infusion cylinder 100 contains the dose of ground coffee 32 without compressing it mechanically.

Adjustment of the position of the upper travel limit stop of the infusion cylinder can take place according to different modes.

In a first adjustment mode, the controller must know the size of the dose of ground coffee loaded in the infusion cylinder 100. In a preferred embodiment, this is made possible by equipping the coffee machine with a grinder. As is known, with the grinding rate and particle size remaining unchanged, the dose of ground coffee loaded is directly proportional to the grinding time.

Therefore, a user interface is provided on the control panel of the coffee machine and with this user interface it is possible to select a known size of a dose of ground coffee to be loaded, from amongst a plurality of known sizes of predefined doses. The controller acquires this selection, then automatically calculates the corresponding grinding time and acquires from a database a reference value, stored in the memory thereof, for the position of the upper travel limit stop of the infusion cylinder 100 corresponding to the grinding time thus calculated. In practice, considering the rectilinear trajectory of the infusion cylinder 100 towards the closing piston 8 that is arranged at a fixed height, the greater the dose of ground coffee selected, the lower the reference value will be for the position of the upper travel limit stop of the infusion cylinder 100 acquired from the database. This always ensures closure of the infusion chamber 4 without the closing piston 8 compressing the dose of coffee loaded, when there has been a change in the dose of ground coffee loaded. The controller then commands the movement of the infusion cylinder 100, the current position of which is traceable by means of a specific encoder 50 assembled on board the electrical actuation.

The controller also comprises feedback control, in which, by comparing the actual values of the position of the infusion cylinder in its various stages of operation with predetermined parameters, it proceeds with a possible adjustment of the infusion cycle.

Owing to the presence of the encoder 50 with feedback control, regulation of the infusion cycle parameters thus proves to be particularly refined and precise. Moreover, the consumer's choice is not limited to a small (corto) or large (lungo) serving of coffee, as there is a wide range of options between the two, based on each consumer's individual preferences.

In the case in which the user proceeds with manual loading or in the case in which the grinder is not provided, the user can be provided with one or more measuring scoops differing in amounts for the dose of ground coffee and the corresponding selection buttons can be provided on the user interface. Naturally, for added precision, the coffee machine can comprise means for automatic removal of any excess amount of ground coffee with respect to the dose selected manually by the user.

Figure 6:
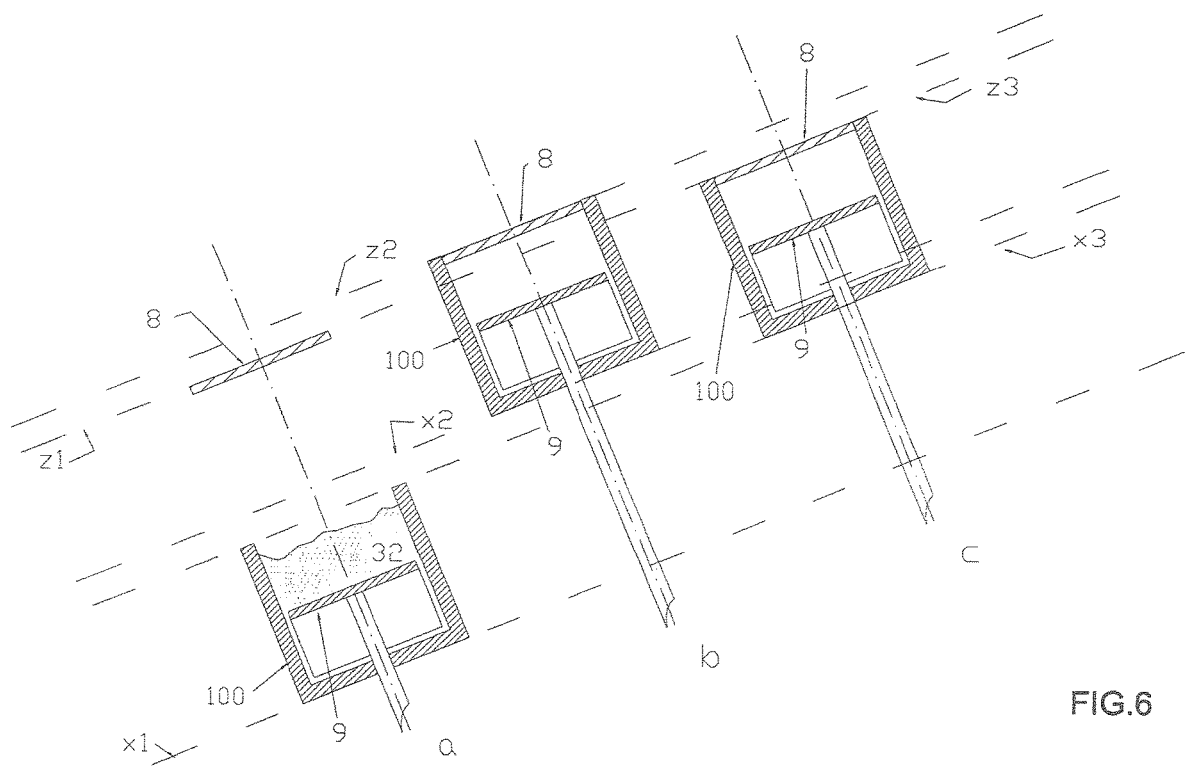
FIG. 6 is a schematic view of the sequence of operative positions reached by the infusion cylinder so as to reach the position of the upper travel limit stop, in a possible embodiment of the invention.

In a second adjustment mode, the controller does not need to know the size of the dose of ground coffee loaded in the infusion cylinder 100. In this case, the controller commands the execution of a first course of travel of the infusion cylinder 100 to a temporary position beyond the position of the upper travel limit stop, and a second course of travel in the opposite direction from the temporary position to the position of the upper travel limit stop of the infusion cylinder 100. In the temporary position of the infusion cylinder 100, the closing piston 8 exerts a predefined level of compression on the dose of ground coffee 32 and the compression is then released when the position of the upper travel limit stop has been reached. When the value of the predefined level of compression is reached, it is signalled to the controller for example by a microswitch that can be activated by a movement of the closing piston 8 or by a detector for detecting absorption of the actuation. For example, the microswitch can be fixed to the fixed part 8b of the closing piston 8 and activated by a cam solidly constrained to the movable part 8a of the closing piston 8. The various operative positions of the infusion cylinder 100 are schematically shown in FIG. 6, where: in the position of the lower travel limit stop (position a), the infusion cylinder 100 is positioned at height x1 and the closing piston is positioned above at height z1; in the temporary position (position b), the infusion cylinder 100 is positioned at height x2>x1 and the closing piston is positioned at height z2>z1; and in the position of the upper travel limit stop (position c), the infusion cylinder 100 is positioned at height x1<x3<x2 and the closing piston is positioned at height z3=z1.

The following is an example of one operating mode of the coffee machine 1 in the case in which it is equipped with a grinder.

The infusion cylinder 100 is at its lower travel limit stop, in which the upper access mouth 4c of the infusion chamber 100 is vertically aligned below a hopper 36 for loading the load of coffee grounds 32.

The ejection piston 9 is in its retracted position towards the bottom 4b *of the infusion cylinder* 100.

The user starts an operating cycle of the coffee machine 1 using a specific selection button for selecting a type of beverage (thus selecting the dose of ground coffee to be loaded in the infusion cylinder 100).

The hopper 36 thus releases a known dose of ground coffee 32, which enters the infusion cylinder 100 by virtue of gravity.

The controller retrieves the reference value for the position of the upper travel limit stop corresponding to the dose of ground coffee loaded and then activates the endless screw 19, which leads the infusion cylinder 100 to define a closed infusion chamber 4 of the smallest possible volume without leading to compression of the loaded dose of coffee.

The controller then commands the opening of a shut-off valve (unillustrated) located on the supply line 5 and the closing of a shut-off valve (unillustrated) located on the drain line 7.

The controller activates the feed pump and the boiler so as to supply a flow of infusion water to the infusion unit 3.

Optimal infusion conditions correspond to a flow of infusion water having a pressure level ranging between the atmospheric pressure and $2 \times 10^5$ Pa, and a temperature ranging between 85° C. and 100° C.

By way of example, the flow of infusion water has a temperature of 90° C. and a pressure level of $1.4 \times 10^5$ Pa.

The flow rate of the flow of infusion water is preferably within the range of 100 cc/min to 200 cc/min, by way of example a flow rate of 150 cc/min.

At the end of the infusion process, the controller commands the closing of the shut-off valve located on the supply line 5, the opening of the shut-off valve located on the drain line 7, and again activates the endless screw 19 in the same direction of rotation.

During this supplementary translational movement, the volume of the infusion chamber 4 decreases in that the closing piston 8 approaches the ejection piston 9 and the dose of spent coffee grounds 33 is compressed.

The liquid contained in the dose of spent coffee grounds 33 is drained into the drain line 7. At the end of the drying process for drying the dose of spent coffee grounds 33, the controller reactivates the endless screw 19 with an inverted direction of rotation so as to disengage the infusion unit 3 from the closing piston 8 and bring it back to its initial position.

During a first stage of the descent of the infusion unit 3, the linkage 16 is activated by the effect of the interaction of the cam 18 with the arm for taking movement 28 and the ejection piston rises from the bottom 4b of the infusion chamber 4 until it brings the dose of spent and dried coffee grounds 33 to the level of the access mouth 4c.

In a subsequent part of the descent of the infusion unit 3, a cam device (unillustrated) also triggered by the movement of the infusion unit 3, activates a scraper 37 positioned laterally to the access mouth 4c.

The scraper sweeps the access mouth 4c, making the dose of spent and dried coffee grounds 33 drop into a specific container 38.

In a subsequent part of the descent of the infusion unit 3, the linkage 16 is activated by the effect of the interaction of the cam 17 with the arm for taking movement 27 and the ejection piston 9 retracts towards the bottom 4b of the infusion cylinder 100.

The use of the coffee machine of the invention has been found to be extremely advantageous as a percolator for producing a cup of coffee similar to drip or American coffee.

The coffee machine and the relative control method thus conceived are susceptible to numerous modifications and variants, all of which falling within the scope of the inventive concept; moreover, all details may be replaced with other technically equivalent elements.

The materials used, as well as the dimensions, may in practice be of any type, according to needs and the state of the art.

The invention claimed is:

1. A coffee machine (1) comprising:
a controller and a database in communication therewith,
an infusion cylinder (100) configured to be loaded with a dose of ground coffee (32),
an ejection piston (9) slidably supported inside the infusion cylinder (100),
a closing piston (8) configured to be engageable within the infusion cylinder (100) to create a closed infusion chamber (4) for the dose of ground coffee (32) delimited between a lateral wall of the infusion cylinder (100), the ejection piston (9) and the closing piston (8),
an electrical actuator configured to move said infusion cylinder (100), and to adjust a volume of said infusion chamber (4) between a lower travel limit stop, where the dose of ground coffee (32) is loaded, and an upper travel limit stop, where the infusion process is carried out, and
an encoder in communication with the actuator configured to provide a position of the infusion cylinder (100),
wherein, during an infusion process, the coffee machine is configured to:
adjust a position of said upper travel limit stop based on a size of the dose of ground coffee (32) loaded, so that in the position of said upper travel limit stop said fusion chamber (4) is of a volume sufficient to contain the dose of ground coffee (32) without compressing it,
wherein, to provide adjustment of the position of said upper travel limit stop, during the infusion process, the controller is configured to:
communicate with the database, where the database includes an association between sizes of the doses of ground coffee than can be selected by a user, durations of grinding times corresponding to the sizes of the doses of ground coffee that can be selected, and the extent of the courses of travel corresponding to the durations of the grinding times,
receive selection, provided into a user interface, of a size of a dose of ground coffee,
automatically determining the corresponding grinding time,
acquiring from said database a reference value for the position of upper travel limit stop of the infusion cylinder (100) corresponding to the grinding time thus determined, and
commanding activation of the electrical actuator, thereby moving said infusion cylinder (100) until said acquired reference position is reached,
receiving a signal indicative of the position of the infusion cylinder (100) from the encoder.

2. The coffee machine (1) according to claim 1, wherein said controller comprises feedback control, in which, by comparing actual values provided by the encoder concerning the position of the infusion cylinder (100) in its various stages of operation with predetermined parameters, the controller proceeds with a possible adjustment of infusion cycle.

3. The coffee machine (1) according to claim 1, further configured to load ground coffee doses of a known size in the infusion cylinder (100).

4. The coffee machine (1) according to claim 3, wherein the ground coffee doses of a known size are loaded by a grinder.

5. The coffee machine (1) according to claim 1, wherein said closing piston (8) is translatable in contrast to and by action of at least one spring (11).

6. The coffee machine (1) according to claim 5, wherein adjustment of the position of said upper travel limit stop includes use of a microswitch activated by movement of said closing piston (8).

7. The coffee machine (1) according to claim 1, wherein adjustment of the position of said upper travel limit stop includes use of a detector for detection of the absorption resulting from movement of said infusion cylinder (100).

* * * * *